United States Patent [19]

Marcus et al.

[11] Patent Number: 5,182,170
[45] Date of Patent: Jan. 26, 1993

[54] METHOD OF PRODUCING PARTS BY SELECTIVE BEAM INTERACTION OF POWDER WITH GAS PHASE REACTANT

[75] Inventors: Harris L. Marcus; Udaykumar Lakshminarayan; David L. Bourell, all of Austin, Tex.

[73] Assignee: Board of Regents, The University of Texas System, Austin, Tex.

[21] Appl. No.: 692,172

[22] Filed: Apr. 26, 1991

Related U.S. Application Data

[63] Continuation-in-part of Ser. No. 559,338, Jul. 30, 1990, Pat. No. 5,076,869, which is a continuation of Ser. No. 402,694, Sep. 5, 1989, Pat. No. 4,944,817.

[51] Int. Cl.$^5$ .......................... B22F 3/00; B32B 19/00; B32B 31/00; B23K 26/00
[52] U.S. Cl. .................... 428/551; 156/62.2; 156/272.8; 219/121.66; 264/125; 428/357
[58] Field of Search .............. 156/62.2, 89, 272.8, 156/242, 245, 278, 283, 643; 219/121.6, 121.61, 121.63, 121.64, 121.65, 121.66, 121.73, 121.8, 121.85; 264/22, 58, 113, 125, 126, 127, 82; 425/174; 427/53.1; 428/357, 420, 545, 546, 551

[56] References Cited

U.S. PATENT DOCUMENTS

| | | | |
|---|---|---|---|
| 4,117,302 | 9/1978 | Earle et al. | 219/121 |
| 4,300,474 | 11/1981 | Livsey | 118/641 |
| 4,323,756 | 4/1982 | Brown et al. | 219/121 |
| 4,474,861 | 10/1984 | Ecer | 428/614 |
| 4,575,330 | 3/1986 | Hull | 425/174.4 |
| 4,818,562 | 4/1989 | Arcella et al. | 427/53.1 |
| 4,863,538 | 9/1989 | Deckard | 156/62.2 |
| 4,938,816 | 7/1990 | Beaman et al. | 156/62.2 |
| 4,944,817 | 7/1990 | Bourell et al. | 156/62.2 |
| 5,017,317 | 5/1991 | Marcus | 264/81 |
| 5,076,869 | 12/1991 | Bourell et al. | 156/62.2 |

FOREIGN PATENT DOCUMENTS

0221276 8/1986 European Pat. Off. .
0283003 3/1988 European Pat. Off. .
61-296976 12/1986 Japan .
8802677 4/1988 PCT Int'l Appl. .

OTHER PUBLICATIONS

Magee, et al "Laser Induced Conversion of Molecular Precusors to Thin Films and Deposited Layers," Chem. Mater. 1990,2 (1990), pp. 232-235.
Deckerd, "Selective Laser Sintering," Doctoral Thesis (University of Texas, Dec., 1988).
Leont'ev, "Lazernaja Poverhnostja Obrabotka Metallor i Splavor," (1986), pp. 120-123.
Takei, et al., "Rhenium Films Preparation by Laser Melting," J. App. Phys. 51 (5) (May 1980), pp. 2903-2908.

Primary Examiner—William A. Powell
Attorney, Agent, or Firm—Vinson & Elkins

[57] ABSTRACT

A method and apparatus for selectively sintering a layer of powder to produce a part comprising a plurality of sintered layers. The apparatus includes a computer controlling a laser to direct the laser energy onto each layer of the powder to produce a sintered mass corresponding to a cross-section of the part. For each cross-section, the aim of the laser beam is scanned over a layer of powder and the beam is switched on to sinter only the powder within the boundaries of the cross-section. Powder is applied and successive layers sintered until a completed part is formed. Also disclosed is a method of forming a part by interaction of material in the powder layer with reactants in the surrounding atmosphere, at locations of the powder irradiated by the energy, or laser, beam. The reaction may be nitridation, oxidation or carburization of the powder, with the product being a chemical compound of one or more constituents in the powder with one or more gases in the atmosphere. Alternatively, reduction of the powder may be so enabled by the energy beam so that a metallic phase product is formed at the irradiated locations. Particular benefits of the invention include the densification of the material of the part as a result of the reaction, and the ability to form high temperature materials by way of a relatively low temperature process.

21 Claims, 6 Drawing Sheets

METHOD OF PRODUCING PARTS BY SELECTIVE BEAM INTERACTION OF POWDER WITH GAS PHASE REACTANT

This application is a continuation-in-part of application Ser. No. 559,338, filed Jul. 30, 1990, now U.S. Pat. No. 5,076,869, which is a continuation of application Ser. No. 402,694 filed Sept. 5, 1989, now U.S. Pat. No. 4,944,817, issued Jul. 31, 1990.

This application is also related to copending application Ser. No. 624,419, filed Dec. 7, 1990, and to copending application Ser. No. 657,151, filed Feb. 19, 1991, both assigned to Board of Regents, University of Texas System, and both incorporated herein by this reference.

This invention relates to a method and apparatus which uses a directed energy beam to selectively sinter a powder to produce a part. In particular, this invention relates to a computer aided laser apparatus which sequentially sinters a plurality of powder layers to build the desired part in a layer-by-layer fashion. The present application is particularly directed towards a powder comprising a plurality of materials where the powder has more than one bonding or dissociation temperature.

BACKGROUND OF THE INVENTION

The economies associated with conventional part production methods are generally, related directly to the quantity of parts to be produced and the desired material characteristics of the finished parts. For example, large scale manufacture casting and extrusion techniques are often cost effective, but these production methods are generally unacceptable for small quantities—i.e. replacement parts or prototype production. Many such conventional part production methods require expensive part specific tooling. Even powder metallurgy requires a die for shaping the powder, making powder metallurgy unattractive as a method for producing a small number of parts.

Where only a small number of parts are desired, conventional production methods involving a subtractive machining method are usually used to produce the desired part. In such subtractive methods, material is cut away from a starting block of material to produce a more complex shape. Examples of subtractive machine tool methods include: milling, drilling, grinding, lathe cutting, flame cutting, electric discharge machine, etc. While such conventional machine tool subtractive methods are usually effective in producing the desired part, they are deficient in many respects.

First, such conventional machine tool subtractive methods produce a large amount of waste material for disposal. Further, such machine tool methods usually involve a large initial expense for setting up the proper machining protocol and tools. As such, the set-up time is not only expensive, but relies a great deal on human judgment and expertise. These problems are, of course, exacerbated when only a small number of parts are to be produced.

Another difficulty associated with such conventional machining techniques involves tool wear - which not only involves the cost of replacement, but also reduces machining accuracy as the tool wears. Another limit on the accuracy and tolerance of any part produced by conventional machining techniques is the tolerance limits inherent in the particular machine tool. For example, in a conventional milling machine or lathe, the lead screws and ways are manufactured to a certain tolerance, which limits the tolerances obtainable in manufacturing a part on the machine tool. Of course, the tolerances attainable are reduced with age of the machine tool.

The final difficulty associated with such conventional machine tool subtractive processes is the difficulty or impossibility of making many part configurations. That is, conventional machining methods are usually best suited for producing symmetrical parts and parts where only the exterior part is machined. However, where a desired part is unusual in shape or has internal features, the machining becomes more difficult and quite often, the part must be divided into segments for production. In many cases, a particular part configuration is not possible because of the limitations imposed upon the tool placement on the part. Thus, the size and configuration of the cutting tool do not permit access of the tool to produce the desired configuration.

There are other machining processes which are additive, for example, plating, cladding, and some welding processes are additive in that material is added to a starting substrate. In recent years, other additive-type machining methods have been developed which use a laser beam to coat or deposit material on a starting article. Examples include U.S. Pat. Nos. 4,117,302; 4,474,861; 4,300,474; and 4,323,756. These recent uses of lasers have been primarily limited to adding a coating to a previously machined article. Often such laser coating methods have been employed to achieve certain metalurgic properties obtainable only by such coating methods. Typically, in such laser coating methods the starting article is rotated and the laser directed at a fixed location with the coating material sprayed onto the article so that the laser will melt the coating onto the article.

The above-referenced U.S. Pat. Nos. 4,944,817 and 4,863,538, as well as U.S. Pat. No. 4,938,816, issued Jul. 3, 1990, and PCT publication WO 88/02677, published Apr. 21, 1988, all of which are incorporated herein by this reference, describe a method of producing complex parts directly from a CAD data base which is not subject to the above-described limitations of the various subtractive and additive methods; this new method will be referred to hereinbelow as the "selective beam sintering" or "selective laser sintering" processes. The selective laser sintering process is particularly advantageous in forming prototypes for parts which may subsequently be mass produced, for example by investment casting, or by the use of tooling.

To provide a part having the necessary strength, stability, and integrity to meet the mechanical and temperature stress requirements of its end use, it is of course desirable to form parts of high melting point materials. Accordingly, the formation of ceramic parts by selective beam sintering is desirable. However, many ceramic powders have sintering or melting temperatures which are sufficiently high that selective sintering or melting by a directed energy beam, such as a laser, while still maintaining high dimensional resolution and close tolerances, is not easily achievable at this time.

By way of further background, the above-referenced copending applications Ser. No. 624,419 filed Dec. 7, 1990, and Ser. No. 657,151 filed Feb. 19, 1991, each describe methods and material systems for utilizing composite powders to form high temperature materials by way of the selective beam sintering processes, such high temperature materials including intermetallics and ceramics. The materials formed according to these methods and systems include those with higher melting points than in the constituent powders, thus allowing relatively low power lasers to form high temperature materials.

It is an object of this invention to provide a method of producing a part by the application of energy to selected portions of a powder layer, where the part is defined by the reaction of the powder material with gases in the atmosphere.

It is a further object of this invention to provide such a method where the shape and dimensions of the part are defined by such a method performed in layerwise fashion.

It is a further object of this invention to provide such a method where the part is formed of a composite material.

It is a further object of this invention to provide such a method where the powder includes multiple materials, so that the part is formed of a composite material.

It is a further object of this invention to provide such a method wherein the part being formed densifies as a result of the reaction.

It is a further object of this invention to provide such a method where the part formed has a higher melting point than that of the constituent powder.

Other objects and advantages of the invention will be apparent to those of ordinary skill in the art having reference to the following specification, together with the drawings.

SUMMARY OF THE INVENTION

The problems outlined above are in large measure solved by the method and apparatus of the present invention. The present invention includes a directed energy beam—such as a laser—and is adaptable to produce almost any three dimensional part. The method of the present invention is an additive process, with the powder being dispensed into a target area where the laser selectively sinters the powder to produce a sintered layer. The invention is a layer-wise process in which the layers are joined together until the completed part is formed. The method of the present invention is not limited to a particular type of powder, but rather is adaptable to plastic, metal, polymer, ceramic, wax, semiconductor or amorphous powders, or composite material powders.

Broadly speaking, the apparatus includes a laser or other directed energy source which is selectable for emitting a beam in a target area where the part is produced. A powder dispenser system deposits powder into the target area. A laser control mechanism operates to move the aim of the laser beam and modulates the laser to selectively sinter a layer of powder dispensed into the target area. The control mechanism operates to selectively sinter only the powder disposed within defined boundaries to produce the desired layer of the part. The control mechanism operates the laser to selectively sinter sequential layers of powder, producing a completed part comprising a plurality of layers sintered together. The defined boundaries of each layer correspond to respective cross-sectional regions of the part. Preferably, the control mechanism includes a computer—e.g. a CAD/CAM system—to determine the defined boundaries for each layer. That is, given the overall dimensions and configuration of the part, the computer determines the defined boundaries for each layer and operates the laser control mechanism in accordance with the defined boundaries. Alternatively, the computer can be initially programmed with the defined boundaries of each layer.

In a preferred form, the laser control mechanism includes a mechanism for directing the laser beam in the target area and a mechanism for modulating the laser beam on and off to selectively sinter the powder in the target area. In one embodiment, the directing mechanism operates to move the aim of the laser beam in a continuous raster scan of target area. The modulating mechanism turns the laser beam on and off so that the powder is sintered only when the aim of the laser beam is within the defined boundaries for the particular layer. Alternatively, the directing mechanism aims the laser beam only within the defined boundaries for the particular layer so that the laser beam can be left on continuously to sinter the powder within the defined boundaries for the particular layer.

In a preferred embodiment, the directing mechanism moves the laser beam in a repetitive raster scan of the target area using a pair of mirrors driven by galvanometers. The first mirror reflects the laser beam to the second mirror which reflects the beam into the target area. Shifting movement of the first mirror by its galvanometer shifts the laser beam generally in one direction in the target area. Similarly, shifting movement of the second mirror by its galvanometer shifts the laser beam in the target area in a second direction. Preferably, the mirrors are oriented relative to each other so that the first and second directions are generally perpendicular to each other. Such an arrangement allows for many different types of scanning patterns of the laser beam in the target area, including the raster scan pattern of the preferred embodiment of the present invention.

The method of part production of the present invention includes the steps of depositing a first portion of powder onto a target surface, scanning the aim of a directed energy beam (preferably a laser) over the target surface, and sintering a first layer of the first powder portion on the target surface. The first layer corresponds to a first cross-sectional region of the part. The powder is sintered by operating the directed energy source when the aim of the beam is within the boundaries defining the first layers. A second portion of powder is deposited onto the first sintered layer and the aim of the laser beam scanned over the first sintered layer. A second layer of the second powdered portion is sintered by operating the directed energy source when the aim of the beam is within the boundaries defining the second layer. Sintering of the second layer also joins the first and second layers into a cohesive mass. Successive portions of powder are deposited onto the previously sintered layers, each layer being sintered in turn. In one embodiment, the powder is deposited continuously into the target.

In a preferred embodiment, the laser beam is modulated on and off during the raster scan so that the powder is sintered when the aim of the beam is directed within the boundaries of the particular layer. Preferably, the laser is controlled by a computer; the computer may include a CAD/CAM system, where the computer is given the overall dimensions and configuration of the part to be made and the computer determines the boundaries of each cross-sectional region of the part. Using the determined boundaries, the computer controls the sintering of each layer corresponding to the cross-sectional regions of the part. In an alternative embodiment, the computer is simply programmed with the boundaries of each cross-sectional region of the part.

Additionally, another embodiment of the present invention includes a powder comprising a plurality of materials where the plurality of materials have more than one dissociation temperature. In still another embodiment of the present invention, the powder comprises a plurality of materials where the plurality of materials have more than one bonding temperature.

As used throughout this document, bonding temperature includes but is not limited to, melting temperature, softening temperature and bonding temperature.

In all preferred embodiments of the present invention, the plurality of materials comprise at least one first material blended with at least one second material or at least one first material coated with at least one second material.

As can be appreciated from the above general description, the method and apparatus of the present invention solves many of the problems associated with known part production methods. First, the present invention is well suited for prototype part production or replacement part production of limited quantities. Further, the method and apparatus hereof are capable of making parts of complex configurations unobtainable by conventional production methods. Further, the present invention eliminates tool wear and machine design as limiting factors on the tolerances obtainable in producing the part. Finally, with the apparatus of the present invention incorporated into a CAD/CAM environment, a large number of replacement parts can be programmed into the computer and can be easily produced with little set-up or human intervention.

The method according to the present invention may also be implemented in a method of forming a part of a material which is the product of interaction of a material in the powder with a gas in the atmosphere near the powder. According to this method, a cross-sectional portion of the part being formed is defined by the application of an energy beam to selected portions of the powder layer. At the irradiated locations of the powder, the heat applied by the energy beam is sufficient to cause interaction of the powder with one or more gases in the atmosphere near the powder and formation of the product of the interaction into a densified mass at the irradiated locations; portions of the powder outside of those exposed to the beam remain in powder form. The types of interaction can include nitridation, oxidation, carburization, or reduction of the powder material, and also a densification of the powder material which is catalyzed by the gas reactant. Selection of the powder material, including multiple materials, and of the reactive gases, allows for the formation of parts of single materials, composite materials, or of a graded blend of materials in the layer. The melting point of the reaction product may be higher than that of the powders, allowing a low power energy beam to produce a high temperature part. Other thermal effects of the reaction can facilitate densification of the part being produced, improving its structural strength.

DETAILED DESCRIPTION OF THE PREFERRED EMBODIMENTS

Figure 1:
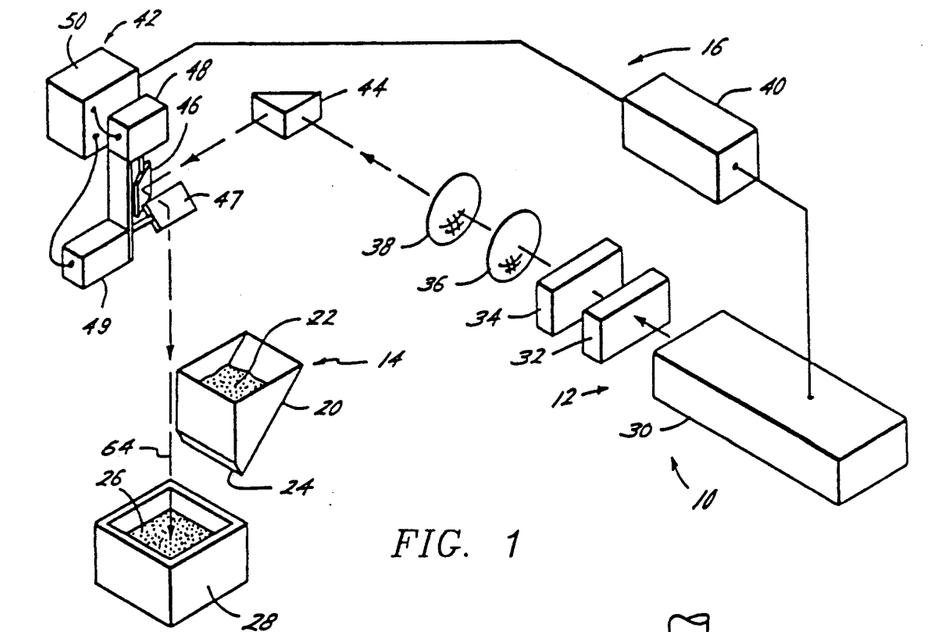
FIG. 1 is a schematic representation of the apparatus of the present invention.

Turning now to the drawings, FIG. 1 broadly illustrates the apparatus 10 in accordance with the present invention. Broadly speaking, the apparatus 10 includes a laser 12, powder dispenser 14, and laser control means 16. In more detail, the powder dispenser 14 includes a hopper 20 for receiving the powder 22 and having an outlet 24. The outlet 24 is oriented for dispensing the powder to a target area 26, which in FIG. 1 is generally defined by the confinement structure 28. Of course, many alternatives exist for dispensing the powder 22.

The components of the laser 12 are shown somewhat schematically in FIG. 1 and include a laser head 30, a safety shutter 32, and a front mirror assembly 34. The type of laser used is dependent upon many factors, and in particular upon the type of powder 22 that is to be sintered. In the embodiment of FIG. 1, a Nd:YAG laser (for example, a Lasermetrics 9500Q) was used which can operate in a continuous or pulsed mode with a hundred-watt maximum outlet power in the continuous mode. The laser beam output of the laser 12 has a wavelength of approximately 1060 nm, which is near infrared. The laser 12 illustrated in FIG. includes an internal pulse rate generator with a selectable range of about one kiloHertz to forty kiloHertz, and an approximately six nanosecond pulse duration. In either the pulsed or continuous mode, the laser 12 can be modulated on or off to selectively produce a laser beam which travels generally along the path shown by the arrows in FIG. 1.

To focus the laser beam, a diverging lens 36 and converging lens 38 are disposed along the path of travel of the laser beam as shown in FIG. 1. Using just the converging lens 38, the location of the true focal point is not easily controlled by varying the distance between the converging lens 38 and the laser 12. The diverging lens 36 placed between the laser 12 and converging lens 38 creates a virtual focal point between the diverging lens 36 and the laser 12. Varying the distance between the converging lens 38 and the virtual focal point, allows control of the true focal point along the laser beam path of travel on the side of the converging lens 38 remote from the laser 12. In recent years there have been many advances in the field of optics, and it is recognized that many alternatives are available to efficiently focus the laser beam at a known location.

In more detail, the laser control means 16 includes computer 40 and scanning system 42. In a preferred embodiment, the computer 40 includes a microprocessor for controlling the laser 12 and a CAD/CAM system for generating the data. In the embodiment illustrated in FIG. 1, a personal computer is used (Commodore 64) whose primary attributes include an accessible interface port and a flag line which generates a non-maskable interrupt.

As shown in FIG. 1, the scanning system 42 includes a prism 44 for redirecting the path of travel of the laser beam. Of course, physical layout of the apparatus 10 is the primary consideration in determining whether a prism 44, or a plurality of prisms 44, are needed to manipulate the path of travel of the laser beam. The scanning system 42 also includes a pair of mirrors 46, 47 driven by respective galvanometers 48, 49. The galvanometers 48, 49 coupled to their respective mirrors 46, 47 to selectively orientate the mirrors 46, 47. The galvanometers 46, 47 are mounted perpendicular to each other such that the mirrors 46, 47 are mounted nominally at a right angle to each other. A function generator driver 50 controls the movement of the galvanometer 48 (galvanometer 49 is slaved to the movement of galvanometer 48) so that the aim of the laser beam (represented by the arrows in FIG. 1) can be controlled in the target area 26. The driver 50 is operatively coupled to the computer 40 as shown in FIG. 1. It will be appreciated that alternative scanning methods are available for use as the scanning system 42, including acusto-optic scanners, rotating polygon mirrors, and resonant mirror scanners.

Figure 2:
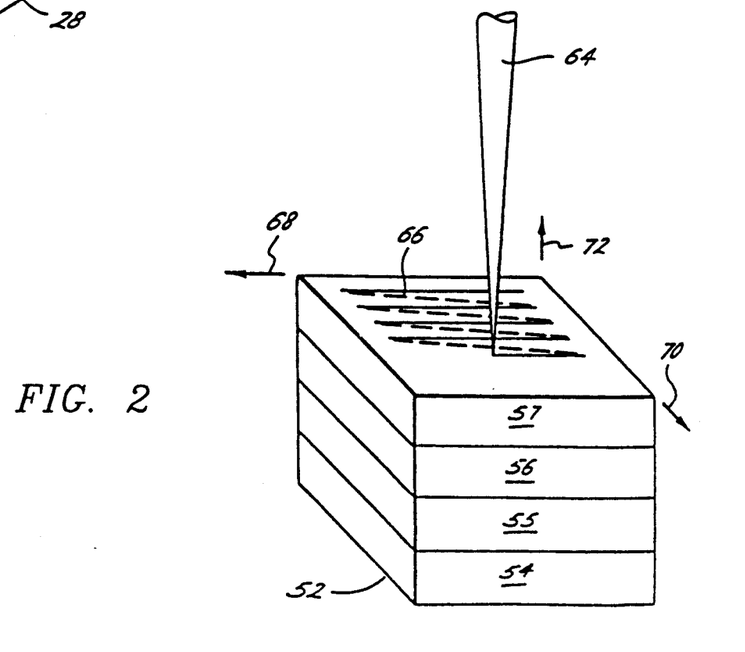
FIG. 2 is a schematic showing a portion of the layered build up of a part produced in accordance with the present invention, and illustrating the raster scan pattern of the laser beam in the target area.

Turning to FIG. 2 of the drawing, a portion of a part 52 is schematically illustrated and shows four layers 54–57. The aim of the laser beam, labeled 64 in FIG. 2, is directed in a raster scan pattern as at 66. As used herein, "aim" is used as a neutral term indicating direction, but does not imply the modulation state of the laser 12. For convenience, the axis 68 is considered the fast scan axis, while the axis 70 is referred to as the slow scan axis. Axis 72 is the direction of part build-up.

Figure 9:
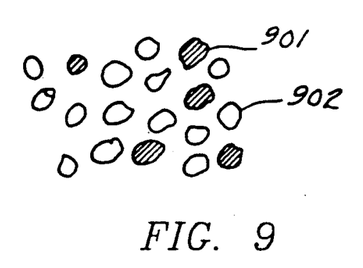
FIG. 9 illustrates a blend of materials in a powder.
Figure 10:
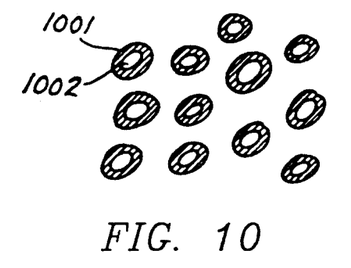
FIG. 10 illustrates materials coated in a powder.

Turning to FIGS. 9 and 10, powders, comprising a plurality of materials by which parts may be made using the present invention, are illustrated. For simplicity, only two materials are shown in the illustrations. However, as will be apparent to one skilled in the art, a plurality of materials may comprise the powder of the present invention.

FIG. 9 illustrates a blend of first material 901 and second material 902. The materials are combined in a blend through conventional blending processes. FIG. 10 illustrates material 1002 coated with material 1001. Material 1002 is coated using conventional coating processes.

As will be further apparent to one skilled in the art, coated materials, as shown in FIG. 10, may be blended to produce a desired mix of materials.

Turning to FIG. 11, a portion of a sintering cycle, as presently understood, is illustrated. FIG. 11a illustrates a blend of materials prior to the application of energy able to produce sintering. Preferably, the materials comprising powder mass 1100 have more than one bonding or dissociation temperature. FIG. 11b illustrates powder 1100 during application of energy sufficient to promote sintering. FIG. 11b illustrates material 1101 having a lower bonding or dissociation temperature than material 1102. In a preferred embodiment, the low temperature phase material 1101 infiltrates powder mass 1100 in the volume surrounding each particle of material 1102. Additional powder components could also be added to the blend to promote infiltration. Similarly a gas phase can be used to promote infiltration and the sintering process. The gas phase may be either inert or active, preferably to either displace an undesired gas or introduce a desired gas. FIG. 11c illustrates a potential mechanism through which effects, including but not limited to, capillarity effects, allow material 1101 to infiltrate the powder mass 1100. FIG. 11d shows the part following sintering in the present invention.

Because a material having a bonding or dissociation temperature higher than the temperature to be obtained during the sintering process may be selected, the higher bonding or dissociation temperature material need not sinter but may retain its original structure. In particular, for crystalline material this enables control of epitaxial growth in the selective beam sintering process of the present invention. For example, if the higher bonding or dissociation temperature material is positioned in a particular structure that may, preferably, result in epitaxial growth from the preceding layer, only bonding or dissociating the lower bonding or dissociation temperature material enables the higher temperature material to retain its structure.

The choice of materials selected for the powder allows for a broad range of resulting sintered material. For example, a conducting material is preferably coated with an insulating polymer material to produce a powder. The powder is then distributed in the target area. The material is preferably sintered and the insulator may be removed later through a conventional process, including but not limited to a chemical method, resulting in a conductive, sintered product.

By way of further illustration, extremely hard materials may be produced using the present invention. For example, tungsten carbide/cobalt tools which, because of their extreme hardness are difficult to form or sharpen may be produced by coating tungsten carbide material with cobalt to produce a powder or by blending tungsten carbide and cobalt to produce a powder. During sintering, the cobalt preferably melts under the applied energy beam causing local infiltration of the tungsten carbide. The part that is manufactured is ready to be put into service preferably after a secondary process including, but not limited to, annealing.

By way of further illustration, copper and tin may be combined in a powder. Tin, having a lower melting temperature than copper, will melt and infiltrate the copper during sintering.

Secondary processing may also be applied to parts produced using the present invention. For example, where tin is allowed to melt and infiltrate copper during sintering, post process thermal treatment will dissolve the tin into the copper in the solid state creating bronze with minimal volume change or distortion.

By way of further illustration, metal, including but not limited to, iron or steel, may be coated with poly(-methyl methacrylate) (PMMA) polymer to form a powder. Sintering enables the PMMA to flow and bind the metal. Post process thermal treatment will dissociate the PMMA and sinter the metal thus producing a final part.

Ceramic materials may be processed in this fashion as well. For example, a mixture of fluorophosphate glass powders with alumina powders will result in the glass softening and infiltrating the alumina during the sintering process. In another example, aluminum silicate, silica, or other ceramic powder can be coated with a polymer by a variety of methods, including spray drying and solvent coating. A surface active agent may be used to pretreat the ceramic powder prior to coating. This agent may be based on organosilane chemistry or other chemistries known to promote the wetability of the ceramic by the polymer and the adhesion of ceramic to polymer. Any polymer, either thermoplastic or thermoset, which can be coated on the ceramic, can be used as a binder. Typical materials include PMMA, polystyrene, various epoxy formulations, and phenolics.

Any combination of materials, including but not limited to, metals, ceramics and polymers enables production of parts in accordance with the present invention wherein at least one material in the powder has a low bonding or dissociation temperature relative to the other materials in the powder.

In another preferred embodiment of the present invention, the temperature of the powder mass may be increased using conventional heating means allowing the energy beam to merely supply a small increase of energy to produce bonding or dissociation of one of the elemental materials of the powder.

Figure 11A:
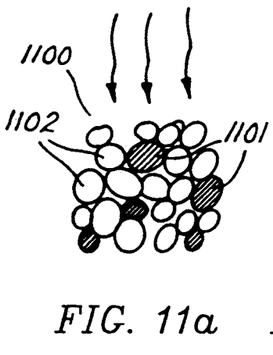
FIG. 11 illustrates a portion of a sintering cycle on a blend of materials as presently understood.
Figure 11B:
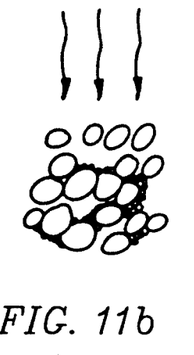
Figure 11C:
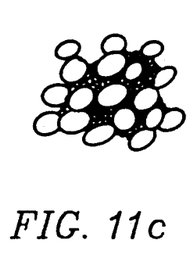
Figure 11D:
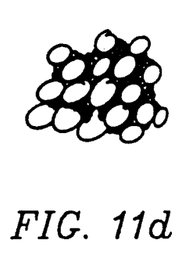

Materials comprising the powder may be chosen for each material's selective absorption of energy from a laser beam (represented by the arrows in FIGS. 11a and 11b). In the preferred embodiment shown in FIG. 11, material 1101 may be chosen to absorb the wavelength of the applied beam energy represented by the arrows while elemental material 1102 absorbs less energy thereby enabling elemental material 1101 to bond or dissociate prior to the bonding or dissociation of elemental material 1102. This absorption of energy can be achieved by either material or laser beam wavelength selection, or both, in a plurality of combinations.

Figure 12:
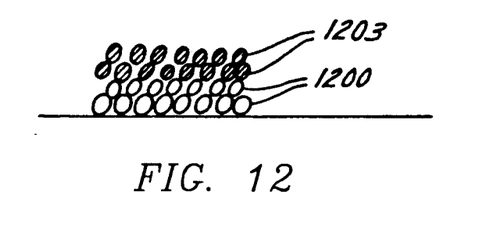
FIG. 12 illustrates two materials deposited prior to sintering.

Turning to FIG. 12, in yet another preferred embodiment a material 1201 is preferably deposited on surface 1200 and second material 1203 is then deposited on material 1201 prior to sintering. Materials 1201 and 1203 preferably have different bonding or dissociation temperatures.

Figure 13A:
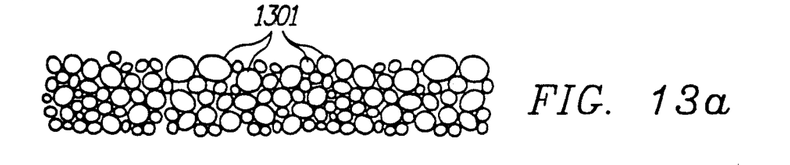
FIGS. 13a through 13e illustrate various stages in the formation of a layer of a part according to another embodiment of the invention, where the powder interacts with a gas at the irradiated locations of the layer.

Referring now to FIGS. 13a through 13e, an alternative embodiment of the invention will now be described, wherein a part is produced in similar layerwise fashion as described hereinabove, but according to the mechanism where material in the powder interacts with a gas phase reactant. FIG. 13a illustrates a layer of a powder, having particles 1301. It should be noted that the size of particles 1301 is preferably somewhat uniform, but will still tend to vary in size. For example, particles 1301 may be sifted through a mesh so that a maximum size particle is defined. For most materials applicable to this embodiment of the invention, the diameter of particles 1301 may be on the order of 100 μm or smaller; a defined distribution of particle sizes may be used to modify the packing density.

While one layer of powder 1301 is illustrated in FIG. 13a, it is of course contemplated that each layer of powder 1301 will overlie a supporting structure, such as a target platform, or piston as used in the SLS TM Model 125 system manufactured and sold by DTM Corporation. In addition, for all but the initial layer of powder 1301, each layer of powder 1301 will overlie other layers, including those which have portions thereof formed into a mass at selected locations according to the method described hereinbelow (or, alternatively, according to other methods). It is contemplated that the following description of the formation of a single layer of a part is sufficient to describe the formation of an entire part, in layerwise fashion.

Figure 13B:
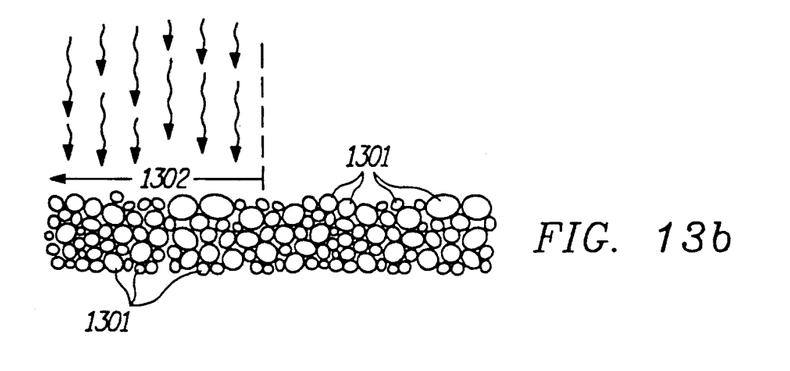

Referring now to FIG. 13b, a selected portion of powder 1301 is then irradiated by an energy beam, in the manner described hereinabove, and also described in the above-referenced U.S. Pat. Nos. 4,944,817, 4,863,538, and 4,938,816, and PCT publication WO 88/02677, incorporated herein by reference. According to this method, a part is produced in layerwise fashion by exposing selected portions of each layer of powder 1301 to a laser beam. Definition of the locations of each powder layer to be so irradiated can be established in a computer-aided-design data base, preferably translated into the control computer for the selective beam sintering apparatus. An example of the preferred system for performing the layerwise production of a part of powder 1301 is the SLS TM Model 125 system manufactured and sold by DTM Corporation. In this system and method, a layer of the powder 1301 is spread by way of a counter-rotating roller across the top of a target piston, to a thickness on the order of 0.005 inches, for a given layer. The temperature of the powder 1301 is preferably well controlled, so that high dimensional tolerances may be maintained.

In the preferred embodiment of the method, referring again to FIG. 13b, portion 1302 of the layer of powder 1301 is to be irradiated with an energy beam. An example of such a beam is that from a Q-switched Nd:YAG laser of wavelength 1.06μ, frequency of 40 kHz, beam spot size of 0.5 mm, and incident power of 20 to 25 Watts, to define a two-dimensional slice of the part to be produced. Other laser sources, such as a $CO_2$ laser of 10.6μ wavelength, with the appropriate power output, can alternatively be used as the energy source. Directional control of the laser is 7 preferably accomplished by galvanometer-controlled mirrors, scanning the powder at a speed in the range of 2 to 6 cm/s, and under the control of a conventional personal computer workstation, such as a model 386-33 manufactured and sold by Austin Computer Systems, based on an 80386 microprocessor as manufactured and sold by Intel Corporation and preferably including a math coprocessor such as an 80387 math coprocessor manufactured and sold by Intel Corporation.

It should also be noted that, for purposes of this embodiment of the invention, energy beams other than lasers may be used. Examples of such other energy beams include electron beams and ion beams. For the case of a directed ion beam, not only would heat be generated in the selected portions of the layer, but the ion beam itself may deliver the reactant with which the powder 1301 reacts to form the compound 1304.

According to this embodiment of the invention, the energy provided by the energy beam heats portion 1302 of powder 1301 to a sufficient temperature that some or all of powder 1301 chemically interacts with a gas in its vicinity, i.e., in the atmosphere within the selective beam sintering chamber. The types of interaction contemplated herein include nitridation, oxidation, carburization and reduction of powder 1301 with the gas, and also densification and other reactions for which the gas in the atmosphere serves as a catalyst. In each case, the thermal conductivity of powder 1301 is preferably low enough that the heat from the energy beam does not conduct to a significant degree outside of the irradiated portion 1302. As a result, upon completion of the formation of the part, the remaining unreacted powder 1301 may be readily removed from the part.

According to this embodiment of the invention, powder 1301 may include particles of a wide range of materials, such as aluminum, silicon, titanium, zirconium, magnesium, calcium, or mixtures of the same. Reactive gases with which these materials can react include nitrogen, oxygen, methane, and combinations and mixtures thereof. Of course, other combinations of powder materials and gases may also be used according to this embodiment of the invention, depending upon the desired material of the part so produced. It is contemplated that both inorganic and organic compounds 1304 may be so formed.

Figure 13C:
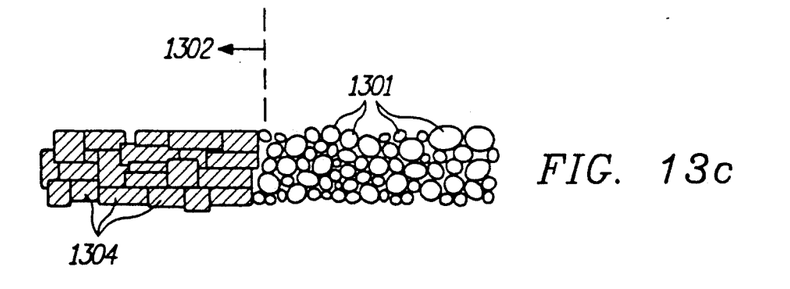
Figure 13D:
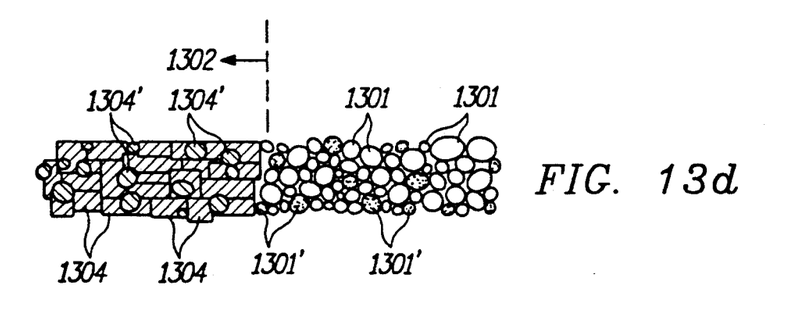

Referring to FIG. 13c, as a result of the exposure of portion 1302 of powder 1301, and the reaction of powder 1301 with gases in the atmosphere, compound 1304 results from the reaction of such gases with powder 1301 thereat. In the example of FIG. 13c, the reaction has occurred fully, throughout the thickness of the layer of powder 1301. If the particles are not fully reacted, a subsequent heat treatment in the appropriate environment may be necessary to drive the reaction to completion.

Referring to the examples of materials for powder 1301 listed hereinabove, and the examples of the reactive gases in the atmosphere in the vicinity of the irradiated portion 1302 of powder 1301, numerous examples of compounds 1304 may be so formed. For example, with nitrogen in the atmosphere, the above-described method can react with powder 1301 containing silicon, aluminum, titanium, and the other materials to form their respective nitrides. In addition, if powder 1301 includes a mixture of materials, as described hereinabove relative to FIG. 11, a composite compound may be so formed. For example, a mixture of aluminum and silicon powder, irradiated by an energy beam in an nitrogen-bearing environment, will form a composite material of aluminum nitride (AlN) and silicon nitride (Si$_3$N ). Such a composite material is illustrated schematically in FIG. 13d, where silicon particles 1301 and aluminum particles 1301' (shown in the non-irradiated portion) react to form a composite of silicon nitride 1304 and aluminum nitride 1304' in the irradiated portion 1302.

It should be noted that, for many powder and gas combinations, densification will also occur at the irradiated locations. This is due to the increase in volume of the powder layer as a result of the reaction of the gas therewith. As a result, as shown in FIG. 13c, the interstitial volume between individual powder particles 1301 shown in FIG. 13a is more completely filled by compound 1304, as shown in FIG. 13c, densifying the resultant part relative to the density of powder 1301, and thereby improving the strength of the final component.

After the formation of compound 1304 at a selected portion 1302 of a layer of powder 1301 as described hereinabove, the next layer of powder 1301 will be disposed thereover, and irradiated in similar fashion at selected locations thereof. The compound 1304 formed in the next layer will bond to the previously formed compound 1304 at common locations (in the x-y plane), so that the mass of the past being produced is formed in layerwise fashion, in a similar fashion as described hereinabove.

Various physical attributes of the powder material 1301 relative to the compound 1304 may be used to advantage according to this embodiment of the invention. For example, the melting point of the compound 1304 may be significantly higher than the temperature at which is was locally formed from powder 1301. One such compound 1304 having such a high melting point is silicon dioxide, which has a melting point of approximately 17600° C. The present invention thus enables the formation of parts of high temperature material, but using relatively low power lasers. Also, the optical properties of materials 1301 and 1304 may be different from one another, allowing the laser energy to better couple to material 1301 than to the compound 1304. As a result, conventional equipment such as the SLS TM Model 125 system manufactured and sold by DTM Corporation may be used to form such high temperature parts, without the extensive and expensive modification, such as would be required to melt or sinter silicon dioxide particles into a mass.

Alternatively, compound 1304 may have a lower melting point than that of powder 1301. This property can be used to advantage relative to desification of the part, as such a compound 1304 may be formed in the liquid phase if the temperature of the reaction is sufficiently high. A melt of compound 1304 will have a high density relative tot he powder 1301 from which it was formed. It is preferable in such a case, however, that the reaction be endothermic, or a controlled exothermic reaction, to prevent the reaction from reaching particles of powder 1301 outside of irradiated portion 1302. Another advantage of compound 1304 having a relatively low melting point is that wetting of the molten compound 1304 on the remaining particles of powder 1301 is likely; this will eliminate the need for a protective atmosphere, or flux, which would otherwise be necessary to achieve proper wetting.

It is also preferable, in many cases, to pre-heat powder 1301 prior to its irradiation by the energy beam. This pre-heating allows for the laser (or other directed energy source) to be of lower power, as it need only apply the incremental heating required for the interaction at the selected locations. The pre-heating also helps to alleviate the residual thermal stress in the part as it is produced, thus reducing tendency of the part to crack when cooled.

Figure 13E:
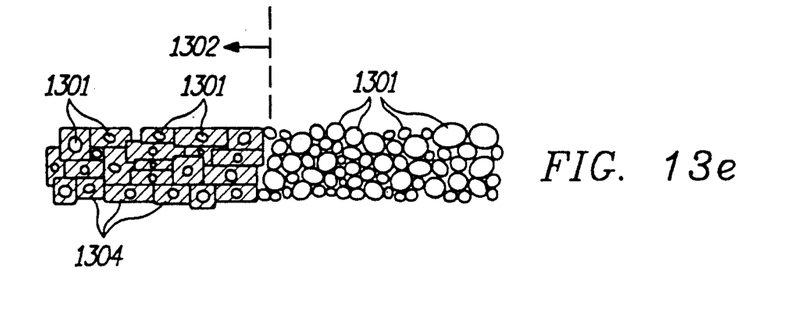

As noted hereinabove, FIG. 13c illustrates the formation of compound 1304 throughout the thickness of the layer of powder 1301. Alternatively, a composite material may be formed by limiting the reaction at the selected portions of the layer, so that only a portion of the particles 1301 react in the irradiated portion 1302 Of the layer. As a result, the material of the part is a composite of particles 1301 coated with compound 1304. An example of such a composite material can be formed by reducing the nitrogen content in the atmosphere when forming silicon nitride according to this method, such that the reaction rate at irradiated portion 1302 is limited by the availability of nitrogen; alternatively, or in combination, the scanning rate may be increased so that the interaction is kinetically limited. Referring to FIG. 13e, an example of such a limited reaction is illustrated, where particles 1301 remain within portion 1302, each of which is coated with compound 1304. Additional layers similarly formed will be bound at locations where compound 1304 is in contact with one another.

Further in the alternative, it is noted that while the reactions referred to hereinabove are reactions which form compounds of the powder material with reactant gases in the atmosphere, the energy beam may alternatively enable reduction of the material of powder 1301 with a gas or gases in the atmosphere, at the selected portions 1302 in the layer. For example, a powder 1301 which contains a metal oxide, metal nitride, or metal carbide, may have such compounds reduced at the selected portions 1302. As a result of the reduction, a metallic surface phase may be formed thereat. In particular, it is contemplated that a metal so formed may have a relatively low melting point, relative to its compound, such that the molten metal can wet the remaining particles in the powder and densify the part thereat.

The reduction reaction may particularly be useful with a powder which is a composite of a metal and a ceramic, for example a $TiO_2/Ti$ system, or traditional metal-ceramic systems (i.e., "cermets"). For such composite powders, reduction of the metal compound (i.e., the ceramic) by a reducing atmosphere containing a gas such as hydrogen can generate a metallic surface phase having a low melting point relative to the ceramic. Significant wetting of the ceramic particles with the metallic phase can then occur with the part densifying accordingly; the composite is schematically similar to that shown in FIG. 13e. In addition, the interface between the ceramic particle and the metallic phase may be compositionally graded, particularly for systems with high solubility bands such as $TiO_2/Ti$. Furthermore, traditional metal-ceramic systems such as tungsten carbide/cobalt cermets exhibit improved toughness by way of a continuous tungsten metallic phase binding the tungsten carbide ceramic particles, thus providing a part with high structural strength.

Further in the alternative, reduction products according to this embodiment of the invention can include refractory metals such as molybdenum, niobium and tungsten, each of which have extremely high melting points. Such materials are not conducive to ease of manufacture of parts according to the conventional selective beam sintering process, but may be readily formed according to this embodiment of the invention.

Further in the alternative, still other types of reactions may be caused, or facilitated, by the irradiation of the selected portion 1302 of a powder 1301 in a layer. For example, it is known that gaseous atmospheres alter the surface free energy of certain metal. As a result, the proper selection of the gaseous atmosphere may have a catalytic effect on the powder surface free energy at the selected portions 1302, such that densification of the part so produced is accelerated by its interaction with a gas at the selected locations heated by the energy beam.

Other alternative reactions are contemplated to now be within the skill of one of ordinary skill in the art having reference to this specification together with the drawings.

OPERATION

A fundamental concept of the present invention is the build up of a part in a layer-by-layer manner. That is, a part is considered a plurality of discrete cross-sectional regions which cumulatively comprise the three-dimensional configuration of the part. Each discrete cross-sectional region has defined two-dimensional boundaries—of course, each region may have unique boundaries.

In the method, a first portion of powder 22 is deposited in the target area 26 and selectively sintered by the laser beam 64 to produce a first sintered layer 54 (FIG. 2). The first sintered layer 54 corresponds to a first cross-sectional region of the desired part. The laser beam selectively sinters only the deposited powder 22 within the confines of the defined boundaries.

There are, of course, alternative methods of selectively sintering the powder 22. One method is for the aim of the beam to be directed in a "vector" fashion—that is, the beam would actually trace the outline and interior of each cross-sectional region of the desired part. Alternatively, the aim of the beam 64 is scanned in a repetitive pattern and the laser 12 modulated. In FIG. 2, a raster scan pattern 66 is used and is advantageous over the vector mode primarily in its simplicity of implementation. Another possibility is to combine the vector and raster scan methods so that the desired boundaries of the layer are traced in a vector mode and the interior irradiated in a raster scan mode. There are, of course, trade-offs associated with the method chosen. For example, the raster mode has a disadvantage when compared to the vector mode in that arcs and lines which are not parallel to the axes 68, 70 of the raster pattern 66 of the laser beam 64 are only approximated. Thus, in some cases resolution of the part can be degraded when produced in the raster pattern mode. However, the raster mode is advantageous over the vector mode in the simplicity of implementation.

Turning to FIG. 1, the aim of the laser beam 64 is scanned in the target area 26 in a continuous raster pattern. Broadly speaking, the driver 50 controls galvanometers 48, 49 to made the raster pattern 66 (see FIG. 2). Shifting movement of the mirror 46 controls movement of the aim of the laser beam 64 in the fast scan axis 68 (FIG. 2), while movement of the mirror 47 controls movement of the aim of the laser beam 64 in the slow scan access 70.

Figure 3:
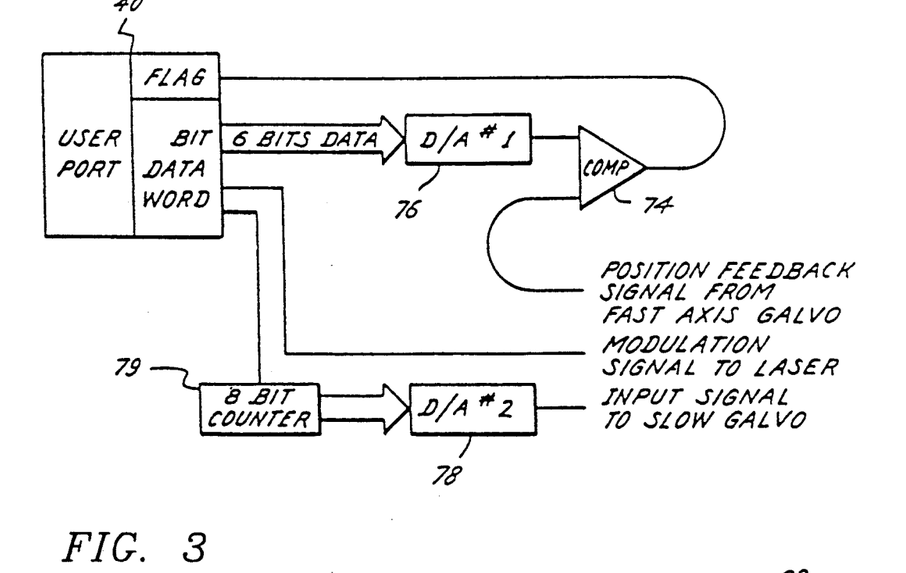
FIG. 3 is a block diagram depicting the interface hardware between the computer, laser and galvanometers of the present invention.

The present position of the aim of the beam 64 is fed back through the driver 50 to the computer 40 (see FIG. 3). As described below, in more detail, the computer 40 possesses information relating to the desired cross-sectional region of the part then being produced. That is, a portion of loose powder 22 is dispensed into the target area 26 and the aim of the laser beam 64 moved in its continuous raster pattern. The computer 40 modulates the laser 12 to selectively produce a laser beam at desired intervals in the raster pattern 66. In this fashion, the directed beam of the laser 12 selectively sinters the powder 22 in the target area 26 to produce the desired sintered layer with the defined boundaries of the desired cross-sectional region. This process is repeated layer-by-layer with the individual layers sintered together to produce a cohesive part—e.g. part 52 of FIG. 2.

In operation, the wavelength of laser 12 may be varied to produce higher absorptivity of energy by selected materials in the powder relative to other materials in powder 22. In operation, blended, coated or other combinations of powders are preferably selected to produce sintered product with characteristics including but not limited to, close dimensional tolerances, structural integrity and required mechanical behavior.

INTERFACE AND SOFTWARE

The interface hardware operatively interconnects the computer 40 with the laser 12 and galvanometers 47, 48. The output port of the computer 40 (see FIGS. 1 and 3) is directly connected to the laser 12 to selectively modulate the laser 12. When operated in the pulsed mode, the laser 12 is easily controlled by digital inputs to the pulsed gate input of the laser. Galvanometer 48 is driven by the function generator driver 50 to drive the beam in the fast scan axis 68 independent of any control signals from the computer 40. However, a position feedback signal from the galvanometer 48 is fed to a voltage comparator 74 as shown in FIG. 3. The other input to the comparator is connected to the digital-to-analog convertor 76 which is indicative of the least significant six bits (bits 0-5) of the user port of the computer 40. As shown in FIG. 3, the output of the voltage comparator 74 is connected to the flag line on the user port of the computer 40. When the voltage comparator determines that the feedback signal from the galvanometer 48 crosses the signal from the digital-to-analog convertor 76, the flag line goes low causing a nonmaskable interrupt. As discussed below, the nonmaskable interrupt causes the next byte of data to put out on the user port of a computer 40.

Finally, as shown in FIG. 3, the galvanometer 49 driving the aim of the laser beam 64 in the slow scan axis 70, is controlled by a second digital to analog convertor 78. The digital-to-analog convertor 78 is driven by a counter 79 which increments with each sweep of the aim of the beam 64 in the fast scan axis 68. The eight byte counter is designed to overflow after 256 scans in the fast scan axis 68 to start a new cycle or raster scan pattern 66.

Preferably, the control information (i.e. defined boundaries of the cross-sectional regions) data for each raster pattern 66 would be determined by a CAD system given the overall dimensions and configuration of the part to be produced. Whether programmed or derived, the control information data for each raster pattern 66 is stored in the computer memory as a series of eight bit words. The data format represents a pattern of "on" and "off" regions of the laser 12, versus distance along the raster pattern 66 traveled by the aim of the beam 64. The data is stored in a "toggle-point" format where the data represents the distance along each raster scan pattern 66 where the laser is modulated (i.e. turned from on to off or from off to on). Although a "bit map" format might be used, the toggle point format has been found more efficient for the production of high resolution parts.

For each eight bit word, the least significant six bits (bits 0-5) represent the location of the next toggle point—i.e. the next location for modulation of the laser 12. The next bit (bit 6) represents whether the laser is on or off immediately before the toggle point identified in the least significant six bits. The most significant bit (MSB or bit 7) is used for looping and for controlling the slow scan axis 70 of the aim of the beam 64. Because the Commodore 64 had limited memory, looping was required —it being understood that a computer 40 with more memory would not require looping.

Figure 6:
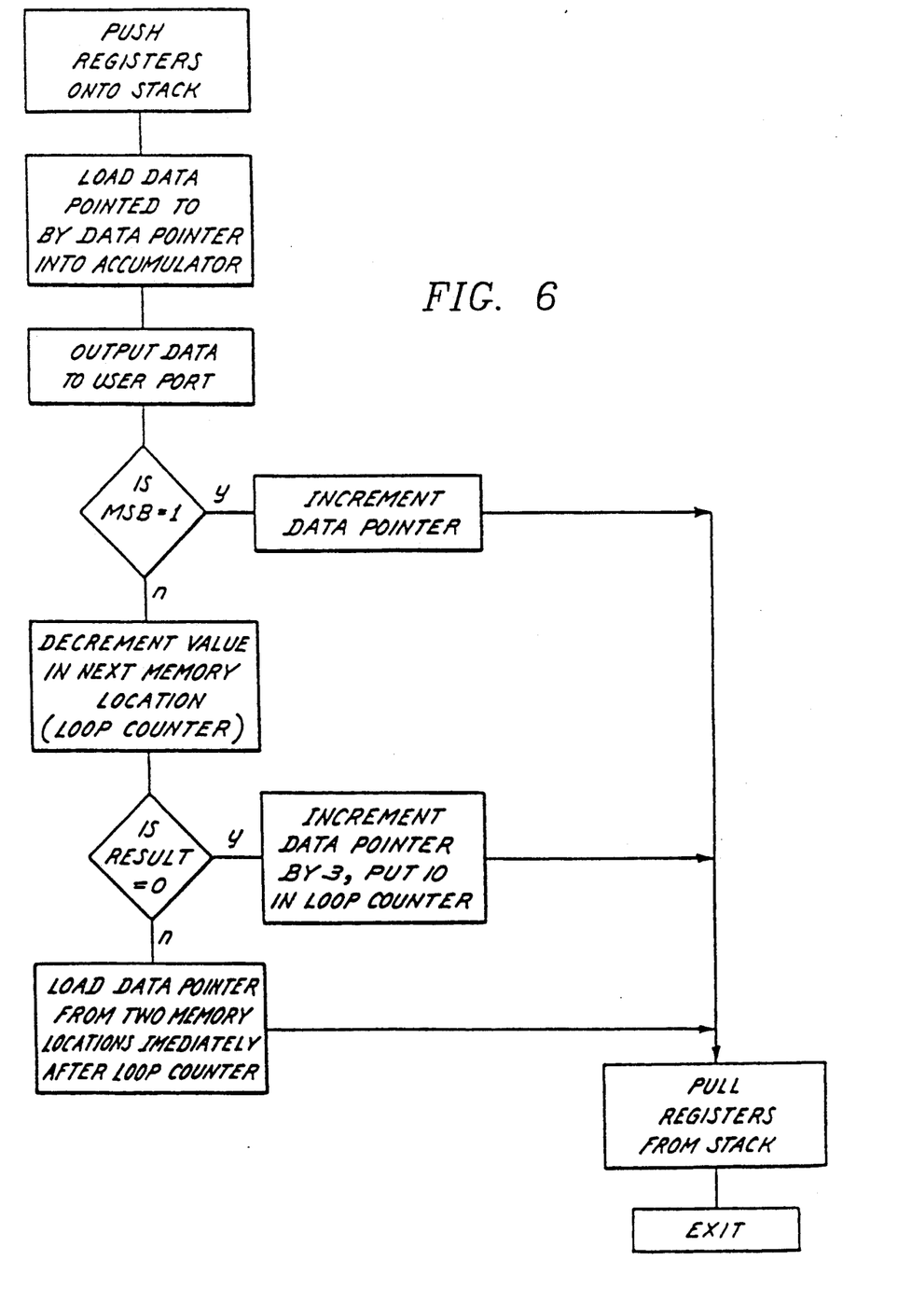
FIG. 6 is a flow chart of the data metering program in accordance with the present invention.

FIG. 6 represents the flow chart for the data metering program. The data metering program is run whenever the flagline goes low causing a non-maskable interrupt (see FIG. 3). The interrupt causes the microprocessor of the computer 40 to retrieve a two byte interrupt vector which points to the location in memory where program control is transferred at interrupt. As shown in FIG. 6, the data metering program first pushes the registers onto the stack and then loads the next byte of data into the accumulator. The data word is also output to the user port with the sixth bit used to modulate the laser 12 (FIG. 3).

As shown in FIG. 6, the most significant bit (MSB or bit 7) of the data word in the accumulator is examined. If the value of the most significant bit is one, that means the end of the loop has not been reached; therefore the data pointer is incremented, registers are restored from the stack, and the data metering program is exited, returning control to the microprocessor at the location of interrupt. If the most significant bit in the accumulator is zero, the data word is the last word in the loop. If the data word is the last word in the loop, the next bit in memory is a loop counter and the following two bytes are a vector pointing to the top of the loop. As can be seen from FIG. 6, if the most significant bit equals zero (end of the loop) the loop counter (next bit) is decremented and analyzed. If the loop counter is still greater than zero, the data pointer assumes the value from the next two memory bytes after the loop counter, registers are pulled from the stack and program control returns to the location of interrupt. On the other hand, if loop counter is zero, the data pointer is incremented by three and the loop counter is reset to ten before exiting the program. It can be appreciated that the need for such looping is absolved if the memory size of the computer 40 is adequate.

EXAMPLE

Figure 4:
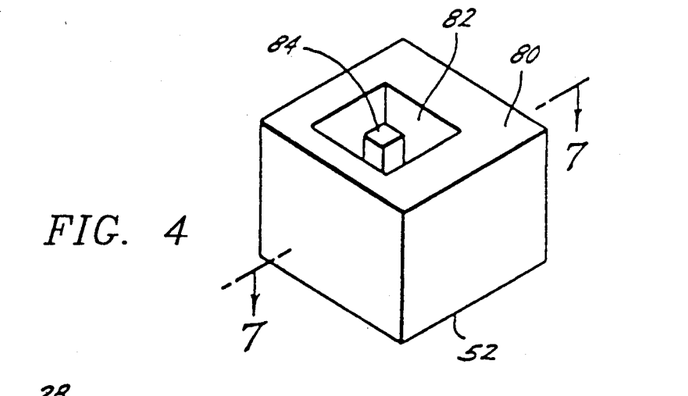
FIG. 4 is a perspective view of an example part produced in accordance with the present invention.
Figure 5:
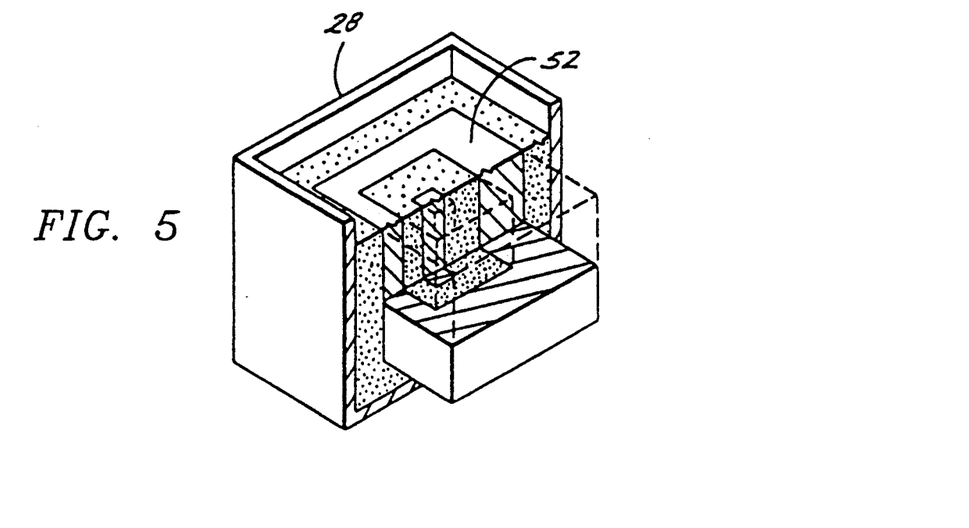
FIG. 5 is a sectional view with parts broken away and in phantom, of the part illustrated in FIG. 4.

In FIGS. 4 and 5, an example part 52 is illustrated. As can be seen from the drawing, the example part 52 assumes an unusual shape in that it is not symmetrical and would be difficult to fabricate using conventional machining methods. For reference purposes, the part 52 includes an outer base structure 80 having an interior cavity 82 and a pillar 84 disposed within the cavity 82 (see FIG. 4). FIG. 5 shows the part 52 within the confinement structure 28 defining the target area 26 illustrated in FIG. 1. As shown in FIG. 5, some of the powder 22 is loose, while the remainder of the powder is selectively sintered to comprise the structure of the part 52. FIG. 5 is shown in vertical section with parts broken away and outlined in phantom to show the sintered cohesive portions of the part 52.

Figure 7:
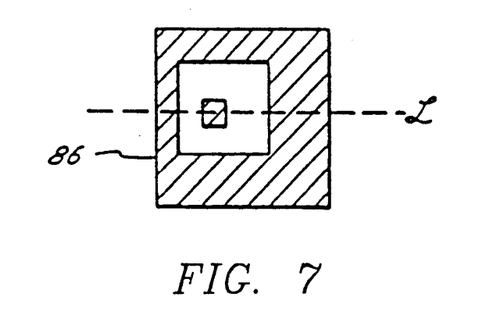
FIG. 7 is a sectional view taken along line 7—7 of FIG. 4.

FIG. 7 shows a horizontal cross-sectional region, taken along line 7—7 of FIG. 4. FIG. 7 represents a discrete layer 86 associated with the cross-sectional region of the part being produced. As such, the sintered layer 86 of FIG. 7 is a product of a single raster pattern 66 as illustrated in FIG. 2.

Figure 8:
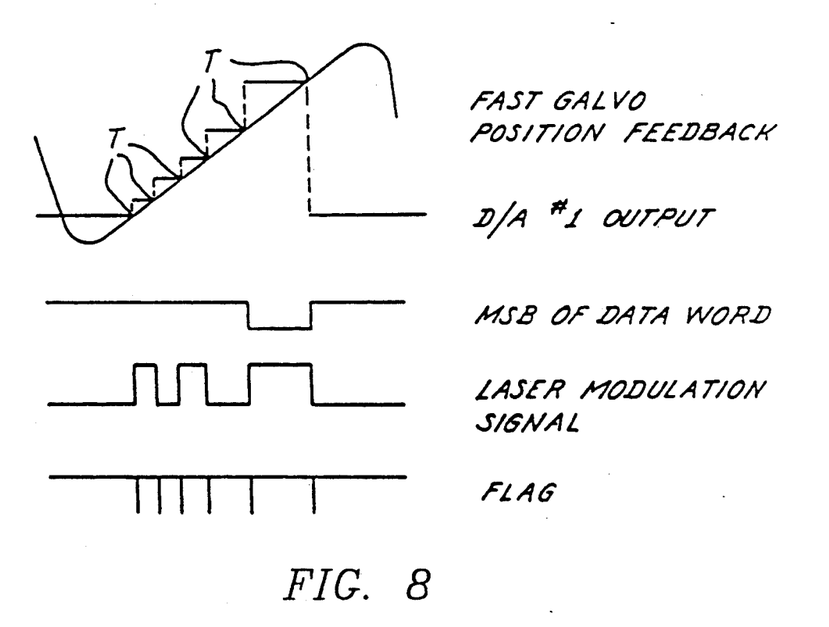
FIG. 8 illustrates in diagram form the correlation between a single sweep of the laser across the layer of FIG. 7 and the control signals of the present invention.

For reference purposes, a sweep line through the sintered layer 86 has been labeled "L." FIG. 8 illustrates the software and hardware interface operation during the sweep L. The top graph shows the position of feedback signal from the fast axis galva 48 and the output signal of the first digital to analog convertor 76 (compare FIG. 3). The voltage comparator 74 generates an output signal to the flag line of the computer 40 every time the feedback signal and first D/A output signal cross.

In the top graph of FIG. 8, these points are labeled T to represent toggle points. As can be seen from the bottom graph of FIG. 8, the flag line generates a non-maskable interrupt corresponding to each toggle point T. The sixth bit of each data word is analyzed and the current state of the laser 12 will reflect the value. The penultimate graph of FIG. 8 shows the laser modulation signal for the sweep line L of FIG. 7. The second graph of FIG. 8 shows that a high-going edge in the most significant bit will be encountered at the end of each sweep of the aim of the laser beam 64 in the fast scan axis 68. As shown in FIGS. 3 and 6, the counter 79 increments on a high going edge, and outputs a signal to the second digital-analog convertor 78 to drive the slow axis galvanometer 49.

As can be seen from the example illustrated in the drawing, parts of complex shape can be produced with relative ease. Those skilled in the art will appreciate that the part 52 illustrated in FIG. 4 would be difficult to produce using conventional machining methods. In particular, machine tool access would make the fabrication of cavity 82 and pillar 84 difficult, if not impossible, to produce if the part 52 were of a relatively small size.

In addition to avoiding the access problem, it will be appreciated that the production accuracy is not dependent upon machine tool wear and the accuracy of mechanical components found in conventional machine tools. That is, the accuracy and tolerances of the parts produced by the method and apparatus of the present invention are primarily a function of the quality of the electronics, the optics, and the implementing software. Of course, heat transfer and material considerations do affect the tolerances obtainable.

Those skilled in the art will appreciate that conventional machining techniques require considerable human intervention and judgment. For example, a conventional machining process, such as milling, would require creativity to make such decisions as tool selection, part segmenting, sequence of cuts, etc. Such decisions would even be more important when producing a control tape for a tape control milling machine. On the other hand, the apparatus of the present invention only requires the data relating to each cross-sectional region of the part being produced. While such data can be simply programmed into the computer 40, preferably, the computer 40 includes a CAD/CAM system. That is, the CAD/CAM portion of the computer 40 is given the overall dimensions and configurations of the desired part to be produced and the computer 40 determines the boundaries for each discrete cross-sectional region of the part. Thus, a vast inventory of part information can be stored and fed to the computer 40 on a selectable basis. The apparatus 10 produces a selected part without set-up time, part specific tooling, or human intervention. Even the complex and expensive dies associated with powder metallurgy and conventional casting techniques are avoided.

While large quantity production runs and certain part material characteristics might be most advantageously made using conventional fabrication techniques, the method and apparatus 10 of the present invention is useful in many contexts. In particular, prototype models and casting patterns are easily and inexpensively produced. For example, casting patterns are easily made for use in sand casting, lost wax casting, or other forming techniques. Further, where desired quantities are very small, such as with obsolete replacement parts, production of such replacement parts using the apparatus 10 of the present invention has many advantages. Finally, the use of the apparatus 10 may be useful where size of production facilities is a major constraint, such as on-ship or in outerspace.

Further modification and alternative embodiments of the apparatus of this invention will be apparent to those skilled in the art in view of this description. Accordingly this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, elements or materials may be substituted for those illustrated and described herein, parts may be reversed, and certain features of the invention may be utilized independently of the use of other features, all as would be apparent to one skilled in the art after having the benefit of this description of the invention.

We claim:

1. A method of producing a part, comprising:
   depositing a powder onto a target surface, said powder comprising a first material;
   exposing the powder to an atmosphere, said atmosphere comprising a reactant gas;
   heating a selected portion of said powder in such a manner as to cause chemical interaction of said first material and said reactant gas, so that a cross-sectional region of the part is defined thereat by the formation of a mass of the product of said interaction.

2. The method of claim 1, wherein said chemical interaction comprises gas-solid reaction of said first material with said first reactant gas to form a compound at the location of said selected portion.

3. The method of claim 1, wherein said chemical interaction comprises:
   reduction of said first material.

4. The method of claim 1, wherein said chemical interaction comprises:
   densification of said powder, catalyzed by said reactant gas.

5. The method of claim 1, further comprising:
   depositing a second layer of said powder after said heating step; and
   heating a selected portion of said second layer of powder in such a manner as to cause chemical interaction of said first material and said reactant gas, so that a second cross-sectional region of the part is defined thereat by the formation of a mass of the product of said interaction.

6. The method of claim 1, wherein said heating step comprises:
   directing an energy beam at selected portions of said powder.

7. The method of claim 6, wherein said energy beam is a laser.

8. The method of claim 1, wherein said reactant gas comprises a gas selected from the group consisting of nitrogen, oxygen and methane.

9. The method of claim 1, wherein said chemical interaction is endothermic.

10. The method of claim 1, wherein said chemical interaction is exothermic.

11. The method of claim 1, wherein the material of said mass after said heating step has a higher melting point than said first material.

12. The method of claim 1, wherein the material of said mass after said heating step has a lower melting point than said first material.

13. The method of claim 1, wherein said exposing step comprises:
   exposing said powder to a limited amount of said reactant gas;
   wherein said chemical interaction occurs at the surface of particles of said first material, such that the product of the reaction coats said first material.

14. The method of claim 1, wherein said powder further comprises a second material.

15. The method of claim 14, wherein said heating step also heats said selected portion of said powder in such a manner that chemical interaction reaction of said second material with said reactant gas also occurs thereat.

16. The method of claim 14, wherein said chemical interaction comprises gas-solid reaction of both said first and second materials with said reactant gas to form compounds thereof at the location of said selected portion.

17. A part produced by the method comprising the steps of:
  depositing a powder onto a target surface, said powder comprising a first material;
  exposing the powder to an atmosphere, said atmosphere comprising a reactant gas;
  heating a selected portion of said powder in such a manner as to cause chemical interaction of said first material and said reactant gas, so that a cross-sectional region of the part is defined thereat by the formation of a mass of the product of said interaction.

18. The part of claim 17, wherein said chemical interaction comprises gas-solid reaction of said first material with said reactant gas to form a compound at the location of said selected portion.

19. The part of claim 17, wherein said chemical reaction comprises:
  reduction of said first material.

20. The part of claim 17, wherein the method further comprises:
  depositing a second layer of said powder after said heating step; and
  heating a selected portion of said second layer of powder in such a manner as to cause chemical interaction of said first material and said reactant gas, so that a second cross-sectional region of the part is defined thereat by the formation of a mass of the product of said interaction.

21. The part of claim 17, wherein said powder further comprises a second material;
  and wherein said heating step also heats said selected portion of said powder in such a manner that chemical interaction of said second material occurs thereat.

* * * * *